US008392738B2

(12) United States Patent
LeFevre et al.

(10) Patent No.: US 8,392,738 B2
(45) **Date of Patent: *Mar. 5, 2013**

(54) BATTERY VOLTAGE SAF AVOIDANCE ALGORITHM FOR A WIRELESS HANDHELD DEVICE

(75) Inventors: John S. LeFevre, Seattle, WA (US); Keith Yamanaka, Edmonds, WA (US); Jeffry Harlow Loucks, Gig Harbor, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

This patent is subject to a terminal disclaimer.

(21) Appl. No.: 12/606,961

(22) Filed: Oct. 27, 2009

(65) Prior Publication Data

US 2010/0050009 A1 Feb. 25, 2010

Related U.S. Application Data

(63) Continuation of application No. 10/989,965, filed on Nov. 15, 2004, now Pat. No. 7,620,834, which is a continuation of application No. 09/870,314, filed on May 29, 2001, now Pat. No. 6,854,066.

(51) Int. Cl.
*G06F 1/28* (2006.01)
*G06F 1/30* (2006.01)

(52) U.S. Cl. ........ 713/340; 713/320; 713/324; 320/127; 320/135; 320/136

(58) Field of Classification Search .................. 713/320, 713/324, 340; 320/127, 135, 136
See application file for complete search history.

(56) References Cited

U.S. PATENT DOCUMENTS 5,027,294 A * 6/1991 Fakruddin et al. ............ 713/300
5,055,766 A * 10/1991 McDermott et al. .......... 323/255
(Continued)

FOREIGN PATENT DOCUMENTS

EP 560510 A1 * 9/1993

OTHER PUBLICATIONS

"Method for Warning Users of a Low Battery Condition on a Battery-Powered Computer"—Nov. 1, 1986, IBM Tecnical Disclosure Bulletin, vol. 29, Issue 6, pp. 2641-2643, NN86112641.*

*Primary Examiner* — Thuan Du

(57) ABSTRACT

A method and system for power source management of a portable device. A power source used to supply electrical energy for a portable device should ideally operate with a constant terminal voltage. However, the terminal voltage of a cell or group of cells used as a source of electrical energy can be expected to reduce in amplitude over its operational lifetime. Near the end of operational lifetime, the terminal voltage of such a source can be expected to decrease rapidly. Furthermore, the source terminal voltage will also exhibit significant variations in amplitude in response to changes in electric current demands on the source. Such source voltage variations can impair or even prevent proper operation of the electronic circuits within the portable device. Power management for proper operation of a portable device is necessary to ensure proper device operation and to prevent loss of data. The present method and system controls portable device operation by periodic determination of average source terminal voltage which is faster and simpler than continuous monitoring used with present systems. Comparison of the periodic average source terminal voltage with stored operational voltage limits allows either temporary or permanent curtailment of certain device operations. Such action can be used to prevent any loss of device data. Further, the present method offers the advantage of identifying momentary fluctuations in source terminal voltage caused by temporary demands in source current levels. Thus, continuous monitoring and prior knowledge of source load demands and equipment as required by present methods are eliminated.

21 Claims, 16 Drawing Sheets

800

INITIALIZE 805
READ $t_1$ 820
$(L-t_1) > K_d$ 830
$C_N > K_A$ 835
C = C+1 840
L = $t_1$ 845
C = Ø 850
$L < T_1$ 855
XMT OFF 860
$L < T_2$ 865
IR OFF 870
$L < T_3$ 875
LITE OFF 880
$L < T_4$ 885
POWER DOWN 890
YES
NO

U.S. PATENT DOCUMENTS 5,570,025 A * 10/1996 Lauritsen et al. ............ 324/433
5,804,894 A * 9/1998 Leeson et al. ................ 307/130
5,870,685 A * 2/1999 Flynn ........................... 455/573
5,978,921 A * 11/1999 Ryu ............................. 713/300
6,150,823 A * 11/2000 Takahashi et al. ........... 324/427
6,266,776 B1 * 7/2001 Sakai ........................... 713/300
6,571,343 B1 * 5/2003 Johnson et al. ............... 713/340
6,691,236 B1 * 2/2004 Atkinson ...................... 713/320
6,708,280 B1 * 3/2004 Tate et al. .................... 713/324
6,854,066 B1 * 2/2005 LeFevre et al. ............... 713/340

* cited by examiner

60

342

BATTERY VOLTAGE SAF AVOIDANCE ALGORITHM FOR A WIRELESS HANDHELD DEVICE

RELATED APPLICATIONS

The present invention is a continuation application of U.S. patent application Ser. No. 10/989,965 filed on Nov. 15, 2004 entitled "A PROGRAMMABLE PRECISION CURRENT CONTROL APPARATUS" by Lefevre et al, assigned to the assignee of the present invention, and which is hereby incorporated by reference in its entirety herein. The U.S. patent application Ser. No. 10/989,965 is a continuation of U.S. patent application Ser. No. 09/870,314, now issued as U.S. Pat. No. 6,854,066 filed May 29, 2001 entitled "Battery Voltage Sag Avoidance Algorithm for a Wireless Handheld Device" by Lefevre et al., assigned to the assignee of the present invention, and which is hereby incorporated by reference in its entirety herein.

RELATED ART

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been known as Personal Digital Assistants (PDAs). Many PDAs have a small and flat display screen associated therewith.

User convenience and device value are very important factors for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

Similarly, the more useful the device, the more the device will be used and acquired. The functionality of mobile wireless devices is undergoing a transition. Mobile devices are evolving from a single application device with a dedicated specific purpose communication channel (for example, a cell phone or pager), to more general-purpose devices with more flexible data communication capabilities.

More specifically, wireless technology is advancing, both in the number of options that are available for providing connectivity, and in the flexibility to provide general purpose data communication. Different technologies such as cellular technologies (e.g., CDMA, TDMA), LAN access technologies (e.g., IEEE 802.11) HomeRF) and PAN technologies (e.g., Bluetooth, IR) each address a different set of needs, and provide a different set of potential services. Mobile devices are no longer restricted to a single communication channel. Modular mobile devices allow network interfaces to be attached, allowing for unlimited communications configurations. In addition, Bluetooth technology allows a single mobile device to simultaneously access multiple piconets through a single interface. To facilitate mobile wireless communication, several wireless modem peripheral devices are available that can be directly connected to the serial interface port of a host computer system thereby providing wireless communication to the internet.

A power source composed of one or more energy storing cells is frequently used to supply the electrical energy required for operation of a portable device such as a PDA. Such a power source must supply the needed electrical current for the device and any attached devices, and should ideally operate with a constant terminal voltage. However, the terminal voltage of a single cell or a group of cells (battery) used as a source of electrical energy can be expected to reduce in amplitude over its operational lifetime. In fact, near the end of operational lifetime, the terminal voltage of such a source can be expected to decrease rapidly. Furthermore, the source terminal voltage will also exhibit significant variations in amplitude in response to changes in electric current demands on the source. For example, functions such as back lighting of a display screen or activation of a radio transmitter will add sudden increases in power source current which may cause significant reductions in the source terminal voltage. Such source terminal voltage variations can impair or even prevent proper operation of the electronic circuits within the portable device, and may possibly result in a loss of stored data.

Power source management methods or systems used in prior art generally employ continuous monitoring of the source terminal voltage. However, continuous monitoring and consequent reactions to terminal voltage fluctuations as accomplished in prior art frequently place an increased burden on software requirements which result in slower system operational speeds. Furthermore, in most prior art methods or systems, a knowledge of source load demands for equipment that could be attached to the portable device is required. This is a drawback since such information requires space for storage in the portable device memory. The main disadvantage here is that the power source management software must continuously search for, and make any necessary adjustments for, the attachment or detachment such equipment. An additional disadvantage present in prior art power management methods or systems occurs because continuous monitoring is required to detect any random act which may affect the source terminal voltage. For example, the keying of a radio transmitter may cause a significant reduction in source terminal voltage.

SUMMARY OF THE INVENTION

Accordingly, what is needed is a more generally applicable method or system that may be used to monitor characteristics of a power source being used to supply electrical energy to a portable device. More specifically, a method or system is needed to modify operation of a portable device by comparing the measured terminal voltage of the power source with a set of stored operational terminal voltage limits. In addition, a method or system that may be incorporated into existing portable devices with ease is needed. Further, the need for a method or system that will react rapidly to a momentary fluctuation in power source terminal voltage in order to preserve stored device data, and at the same time will distinguish between momentary and permanent changes in power source terminal voltage. The need exists also for a method or system that is faster than present methods which utilize continuous terminal voltage averaging schemes. In addition, a method or system for power source management of a portable device that will provide all the above advantages without the need for a pre-existing determination of system components or operation. Such a system will then be effective and will not require reconfiguration when system components are added to or removed from the portable device. In addition, the needed system will be effective when a momentary fluctuation in power source terminal voltage results from an increase in power source current which occurs due to a cause such as operation of an attached wireless radio transmitter. This would be an improvement over existing systems which require continuous monitoring of devices or systems whose operation result in an increase in power source current. Embodiments of the present invention provide the above advantages and others not specifically mentioned above but described in the sections to follow.

A method and system for power source management of a portable device are described. A power source used to supply electrical energy for a portable device should ideally operate with a constant terminal voltage. However, the terminal voltage of a cell or group of cells used as a source of electrical energy can be expected to reduce in amplitude over its operational lifetime. Near the end of operational lifetime, the terminal voltage of such a source can be expected to decrease rapidly. Furthermore, the source terminal voltage will also exhibit significant variations in amplitude in response to changes in electric current demands on the source. Such source voltage variations can impair or even prevent proper operation of the electronic circuits within the portable device. Power management for proper operation of a portable device is necessary to ensure proper device operation and to prevent loss of data. The present method and system controls portable device operation by periodic determination of average source terminal voltage which is faster and simpler than continuous monitoring used with present systems. Comparison of the periodic average source terminal voltage with stored operational voltage limits allows either temporary or permanent curtailment of certain device operations. Such action can be used to prevent any loss of device data. Further, the present method offers the advantage of identifying momentary fluctuations in source terminal voltage caused by temporary demands in source current levels. Thus, continuous monitoring and prior knowledge of source load demands and equipment as required by present methods are eliminated.

In one embodiment of the present invention, a power source management program is stored in the memory of a portable device such as a palmtop computer system. The power source terminal voltage is measured periodically and compared with a prior stored source terminal voltage to determine a current, updated value. If the measured terminal voltage is determined to be momentary, the prior stored terminal voltage value is retained as the current, updated value. Otherwise, the measured terminal voltage is used to calculate a new value which is then stored as the current, updated source terminal voltage. The updated source terminal voltage is then compared with a number of stored operational terminal voltage limits, and one or more system operating functions are terminated when the updated terminal voltage falls outside operational limits. Operating functions subject to termination as the power source terminal voltage decreases include, but are not limited to, radio transmitter operation, infra-red (IR) communication, display screen illumination, liquid crystal display (LCD) operation, and complete system shut down.

Another embodiment of the present invention utilizes a power source management program stored in the memory of a portable device such as a palmtop computer system to terminate one or more system operating functions in response to any decrease in power source terminal voltage. The program periodically determines an updated power source terminal voltage by utilizing at least one periodically measured power source terminal voltage. The program will distinguish between momentary and permanent fluctuations present in measured terminal voltage values and will eliminate momentary values when determining an updated terminal voltage. Operating functions subject to termination as the power source terminal voltage decreases include, but are not limited to, radio transmitter operation, infra-red (IR) communication, display screen illumination, liquid crystal display (LCD) operation, and complete system shut down.

Another embodiment of the present invention includes a portable device such as a palmtop computer system comprising: a memory having a database containing stored operational terminal voltage limits, measured power source terminal voltage data, operational control functions and computational software, wherein the memory is communicatively coupled to the portable device; a processor operable to periodically determine and record an updated power source terminal voltage value based on a measured power source terminal voltage by executing instructions stored in the memory, to distinguish and ignore a voltage source measurement having a momentary fluctuation, to compare an updated terminal voltage value with stored operational voltage limits and to activate stored operational control functions. Operating functions subject to termination as the power source terminal voltage decreases include, but are not limited to, radio transmitter operation, infra-red (IR) communication, display screen illumination, liquid crystal display (LCD) operation, and complete system shut down.

DETAILED DESCRIPTION OF THE INVENTION

Figure 1A:
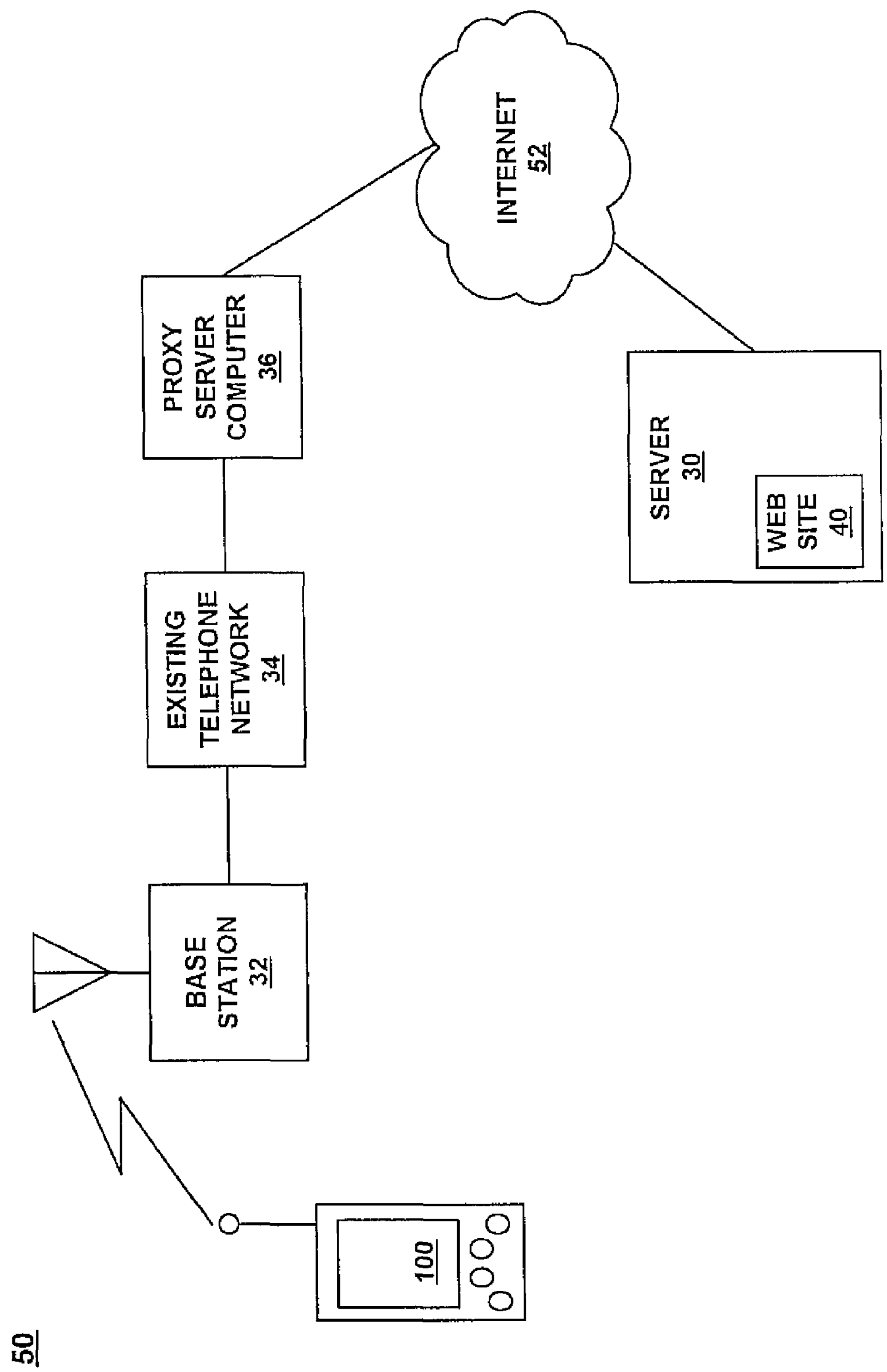
FIG. 1A is a block diagram of an exemplary network environment including a portable computer system in accordance with one embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as “determining” or “indicating” or “indexing” or “receiving” or “performing” or “initiating” or “sending” or “implementing” or “disabling” or “enabling” or “displaying” or the like, refer to the action and processes of a computer system or similar electronic computing device, that manipulates and transforms data represented as physical (electronic) quantities within the computer system’s registers and memories into other data similarly represented as physical quantities within the computer system memories or registers or other such information storage, transmission or display devices.

The present invention is discussed primarily in the context of a portable computer system, such as a palmtop or personal digital assistant, with the capability to access via the Internet a World Wide Web (“Web”) site residing on a server computer system. However, it is appreciated that the present invention can be used with other types of devices that have the capability to access some type of central device or central site, including but not limited to laptop computer systems.

Exemplary Palmtop Platform

FIG. 1A is a block diagram of an exemplary network environment 50 including a portable computer system 100 in accordance with one embodiment of the present invention. Portable computer system 100 is also known as a palmtop or palm-sized computer system or as a personal digital assistant (PDA). In one embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown).

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. Coupled with Internet 52 are multiple servers exemplified by server 30. Residing on server 30 is a Web site 40. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

FIGS. 1B, 1C, 1E and 1F are block diagrams showing various embodiments of a system 51 for coupling a portable computer system 100 to other computer systems and to the Internet 52 in accordance with the present invention. System 51 is described in the context of wired connections between its various devices and components; however, it is appreciated that wireless connections (such as but not limited to Bluetooth wireless connections) can also be used.

Figure 1B:
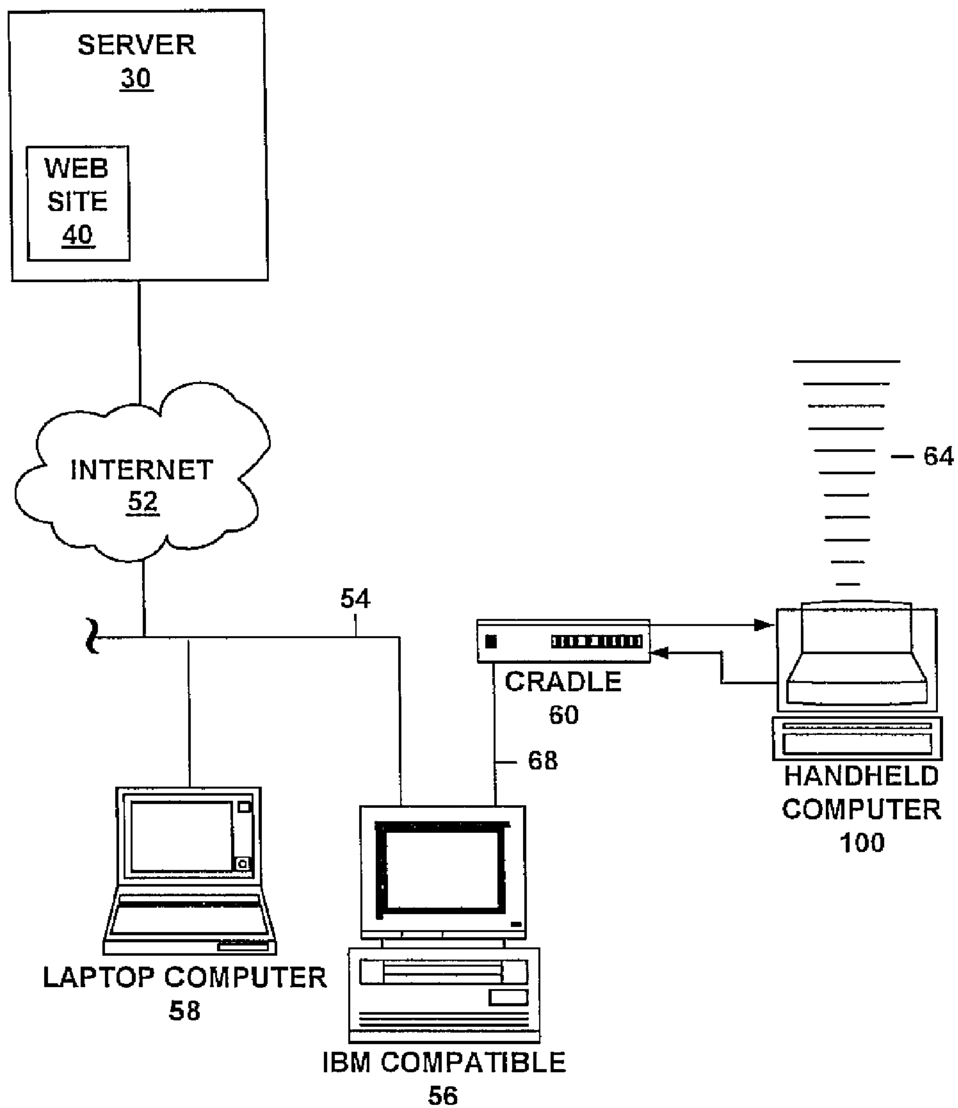
FIGS. 1B, 1C, 1D, 1E and 1F are block diagrams showing various embodiments for coupling a portable computer system to other computer systems and to the Internet in accordance with the present invention.

With reference first to FIG. 1B, system 51 comprises a host computer system 56 which can either be a desktop unit as shown, or, alternatively, can be a laptop system 58. Optionally, one or more host computer systems can be used within system 51. Host computer systems 56 and 56 are shown connected to a communication bus 54 such as an Ethernet Local Area Network (LAN), but which can instead be any of a number of other types. Bus 54 can provide communication with the Internet 52 using a number of well-known protocols. Coupled with Internet 52 are multiple servers exemplified by server 30. Residing on server 30 is a Web site 40.

Importantly, in the present embodiment, host computer system 56 is also coupled via connector cable 68 to a cradle 60 for receiving and initiating communication with portable computer system 100 ("handheld computer") of the present invention. Connector cable 68 can be a serial bus (e.g., RS232), a parallel bus, a Universal Serial Bus (USB), or any other type of workable connection. Cradle 60 provides an electrical and mechanical communication interface between connector cable 68 and portable computer system 100 for two-way communications with host computer system 56. Portable computer system 100 also contains a wireless infrared communication mechanism 64 for sending and receiving information from other devices.

Figure 1C:
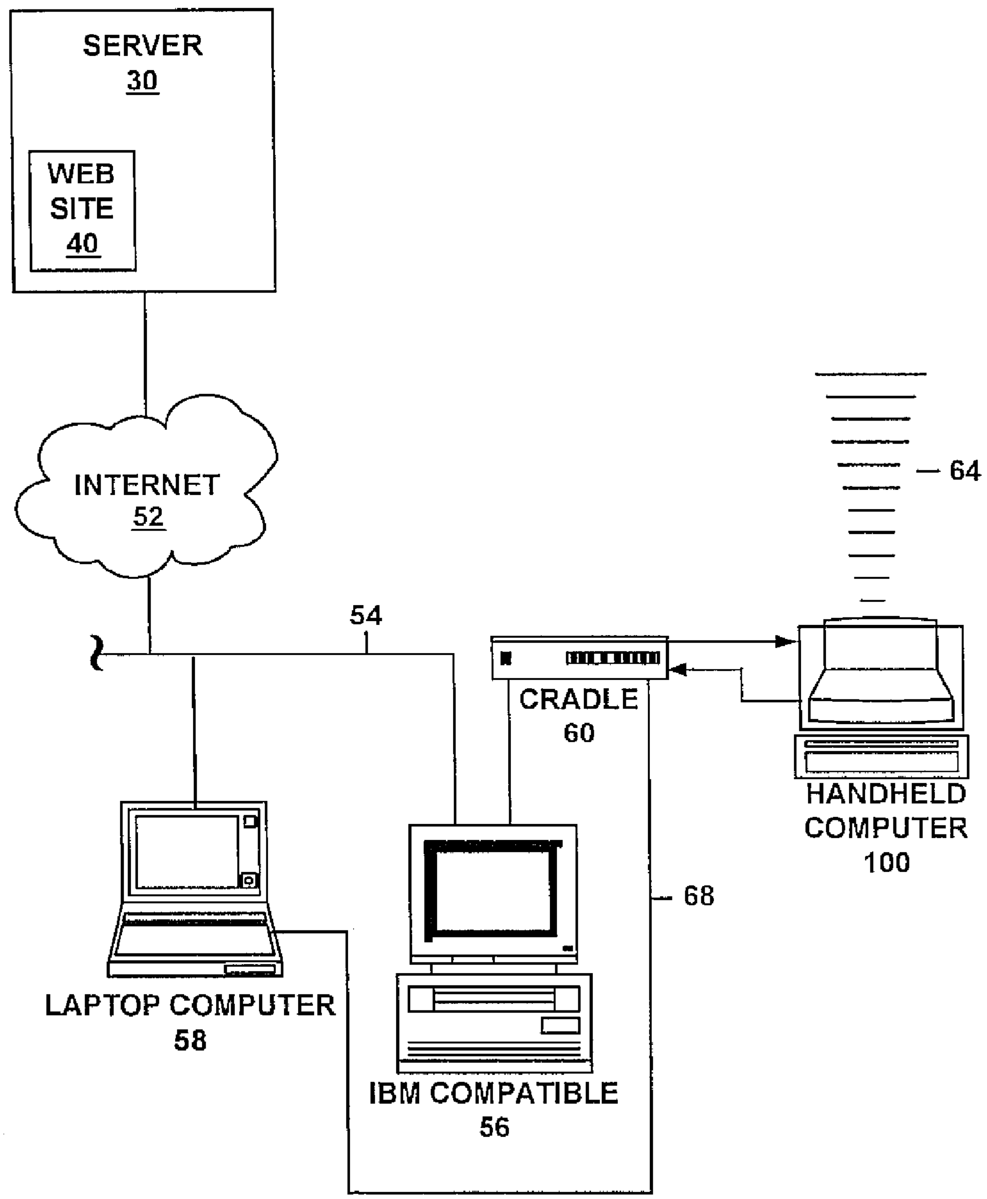

With reference next to FIG. 1C, in this embodiment, laptop system 58 is coupled via connector cable 68 to cradle 60. As described above, connector cable 68 can be a serial bus (e.g., RS232), a parallel bus, a USB, or any other type of workable connection for enabling two-way communication between portable computer system 100 and laptop system 58.

Figure 1D:
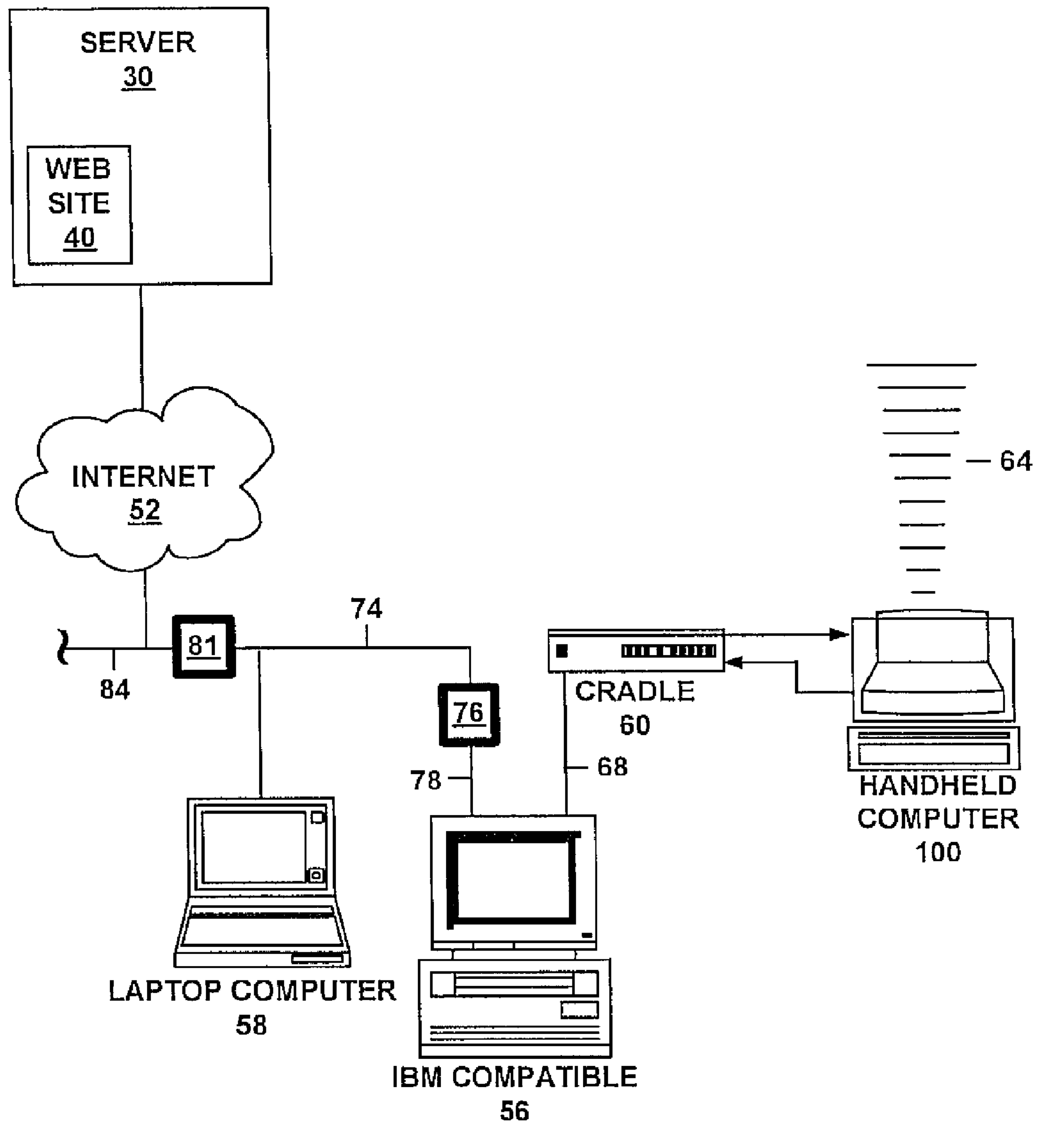

FIG. 1D shows another embodiment of system 51 in accordance with the present invention. In this embodiment, host computer system 56 is coupled via connector cable 68 to cradle 60. Host computer system 56 is also coupled to a modem 76 via another connector cable 78. Connector cable 78 can be a serial bus, a parallel bus, a USB, or any other type of workable connection that can be used for allowing two-way communication between host computer system 56 and the Internet 52. In this embodiment, connector cable 78 is coupled with a wire line 74 to a central office (or cable office, etc.) 81 via modem 76. Modem 76 can be internal to or external to host computer system 56. Modem 76 can be an analog modem, a cable modem, an ADSL (Asymmetric Digital Subscriber Line) modem, or any other such device. Central office 81 in turn is communicatively coupled to the Internet 52 via some type of well-known communication line 84.

Figure 1E:
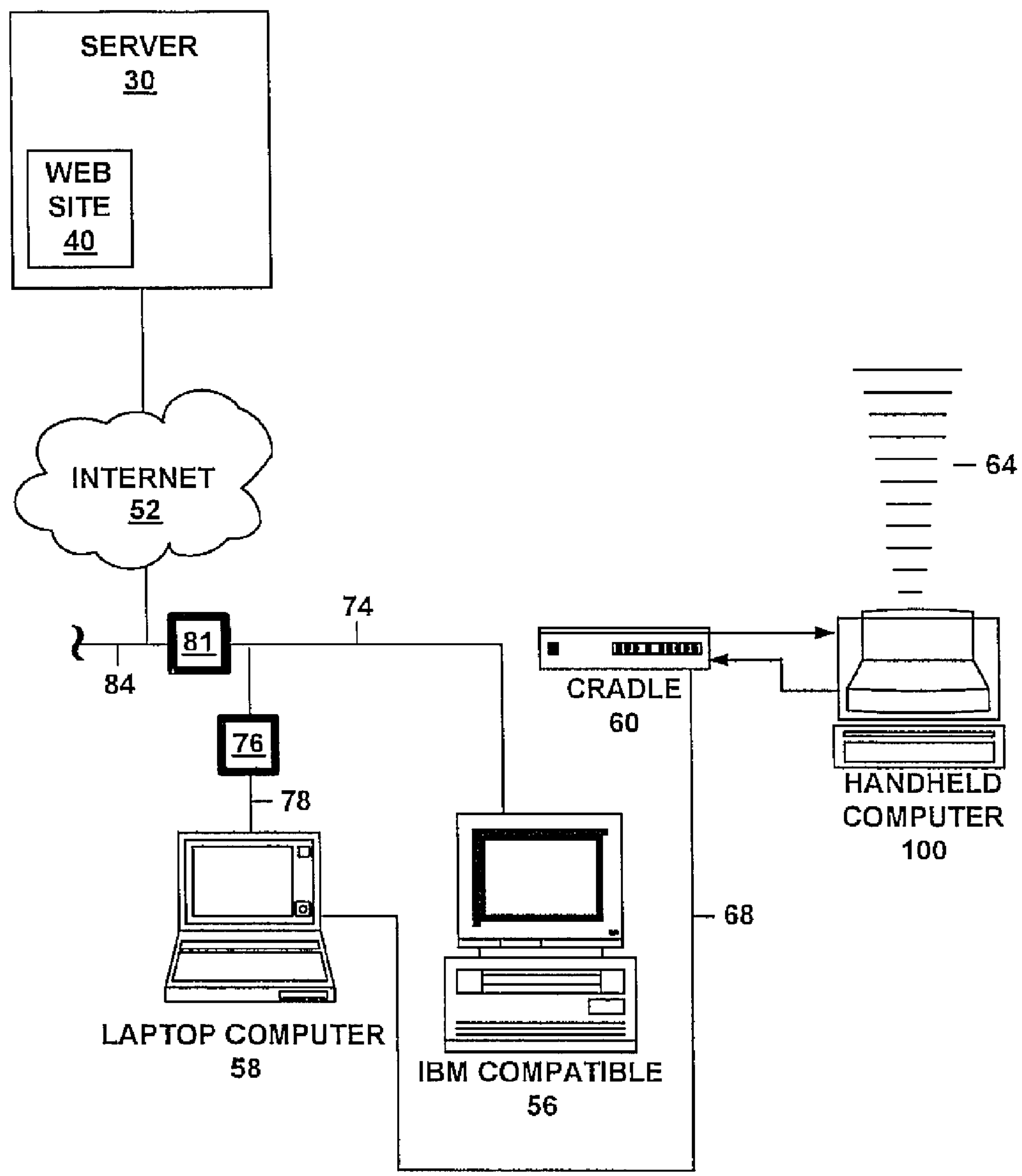

FIG. 1E shows another embodiment of system 51 in accordance with the present invention. In this embodiment, laptop system 58 is coupled via connector cable 68 to cradle 60. Laptop system 58 is also coupled to modem 76 via connector cable 78. In this embodiment, connector cable 78 is coupled with wire line 74 to central office 81 via modem 76. Central office 81 in turn is communicatively coupled to the Internet 52 via communication line 84.

Figure 1F:
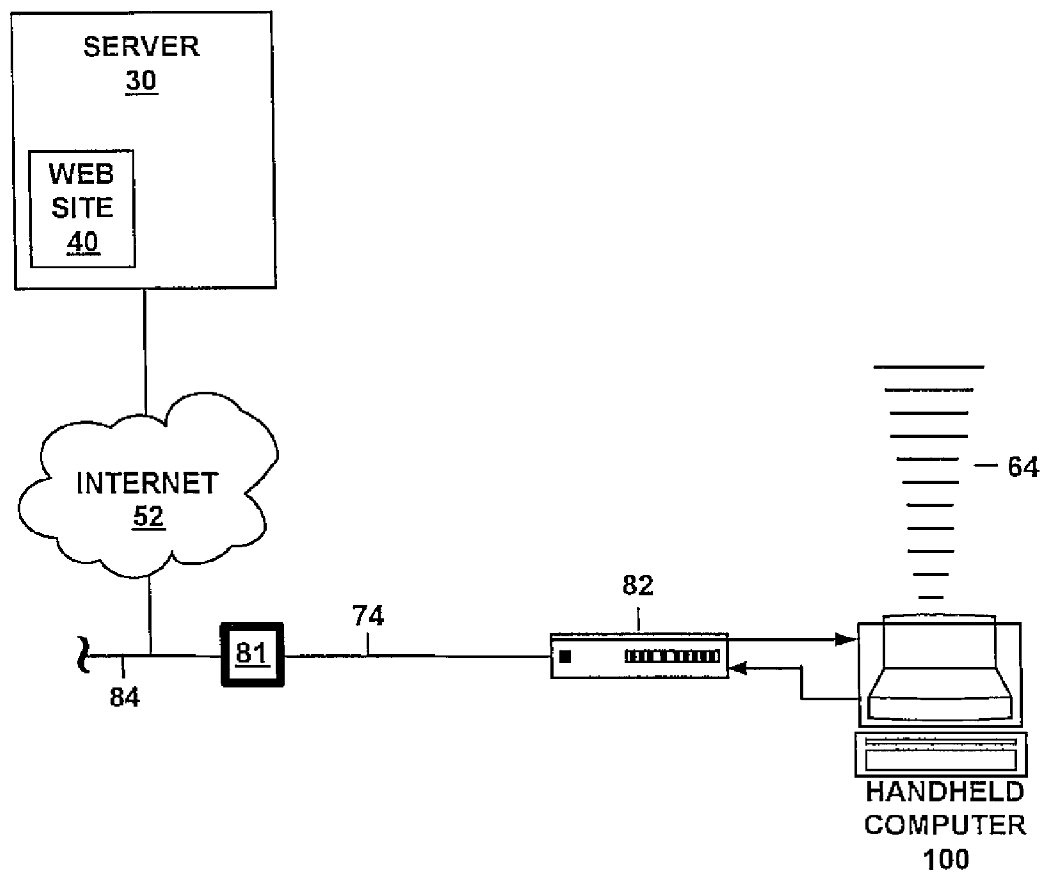

FIG. 1F shows another embodiment of system 51 in accordance with the present invention. In this embodiment, portable computer system 100 is coupled with wire line 74 via a modem 82. In one embodiment, portable computer system 100 is a Palm V or other such PDA, and modem 82 is a Palm V modem or PDA-modem. Wire line 74 is communicatively coupled to central office 81 which in turn is communicatively coupled to the Internet 52 via communication line 84.

With reference to FIGS. 1A through 1F, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
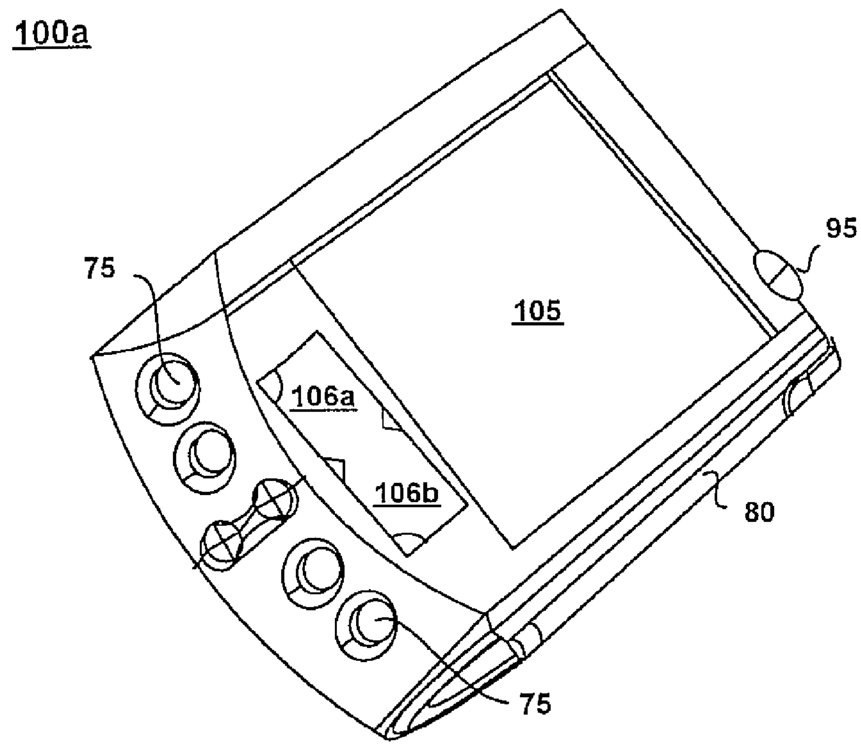
FIG. 2 is a top side perspective view of a portable computer system in accordance with one embodiment of the present invention.

FIG. 2 is a perspective illustration of the top face 100*a* of one embodiment of the palmtop computer system 100 of the present invention. The top face 100*a* contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100*a* also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106*a* and 106*b*. Region 106*a* is for the drawing of alphabetic characters therein (and not for numeric characters) for automatic recognition, and region 106*b* is for the drawing of numeric characters therein (and not for alphabetic characters) for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 3:
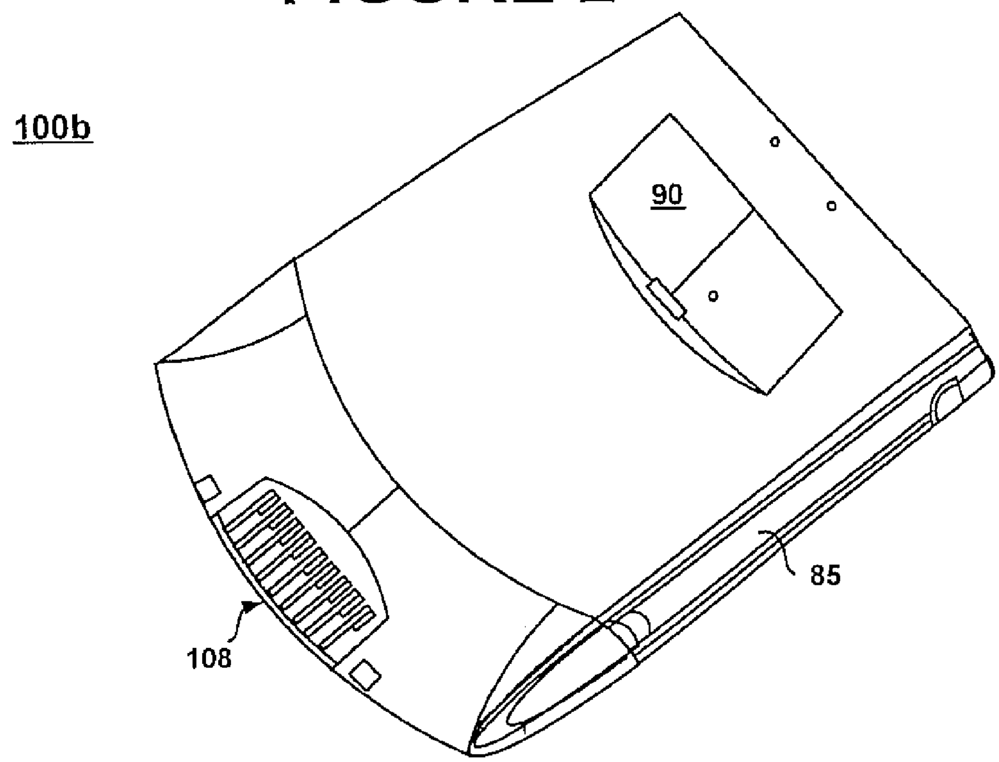
FIG. 3 is a bottom side perspective view of the portable computer system of FIG. 2.

FIG. 3 illustrates the bottom side 100*b* of one embodiment of the palmtop computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 4:
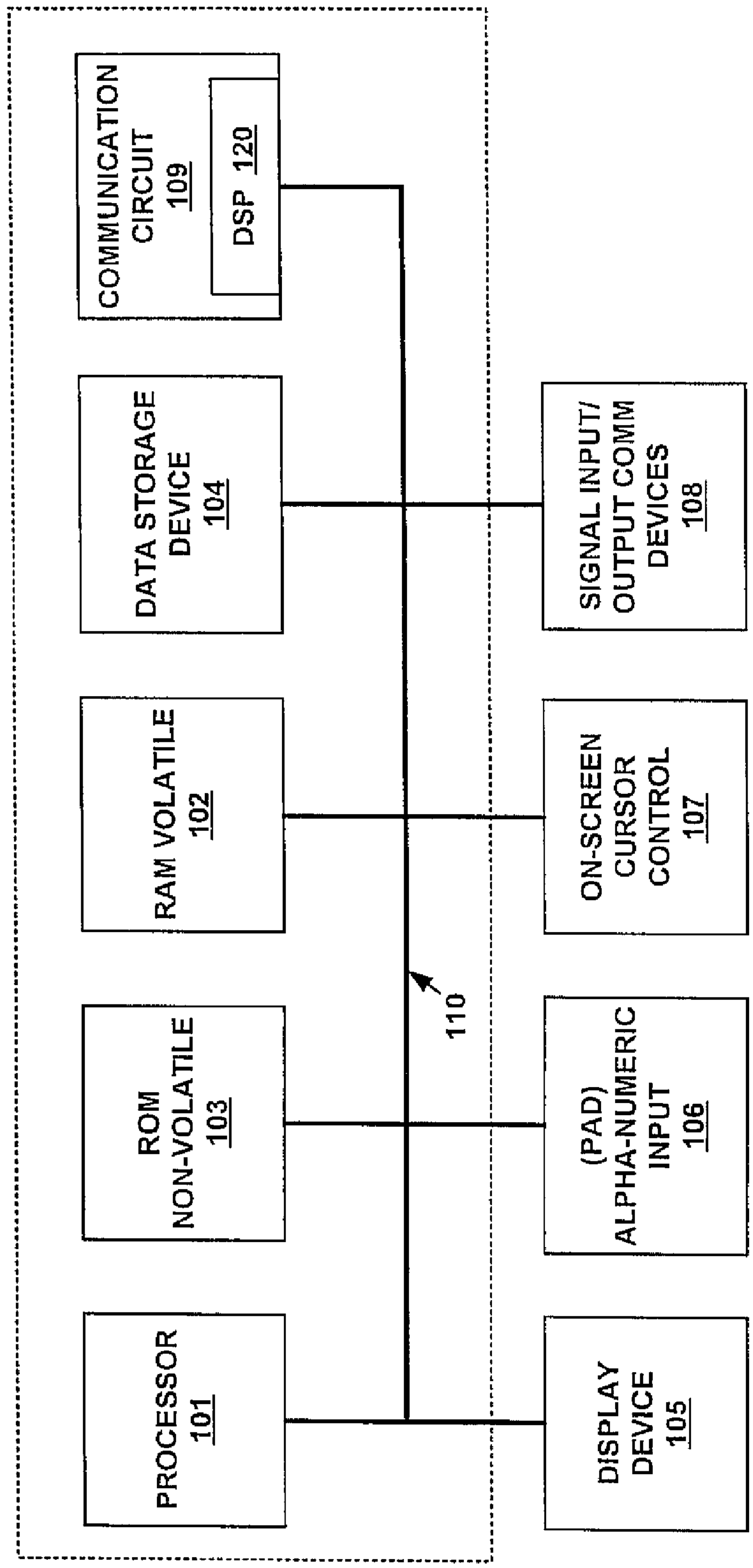
FIG. 4 is a block diagram of one embodiment of a portable computer system in accordance with the present invention.

FIG. 4 illustrates circuitry of computer system 100. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile-memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user.

With reference still to FIG. 4, computer system 100 also includes a signal transmitter/receiver device 10B, which is coupled to bus 110 for providing a physical communication link between computer system 100, and a network environment (e.g., network environments 50 and 51 of FIGS. 1A through 1F). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 3) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 4 is an optional alphanumeric input device 106 that in one implementation is a handwriting recognition pad ("digitizer") having regions 106*a* and 106*b* (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 5:
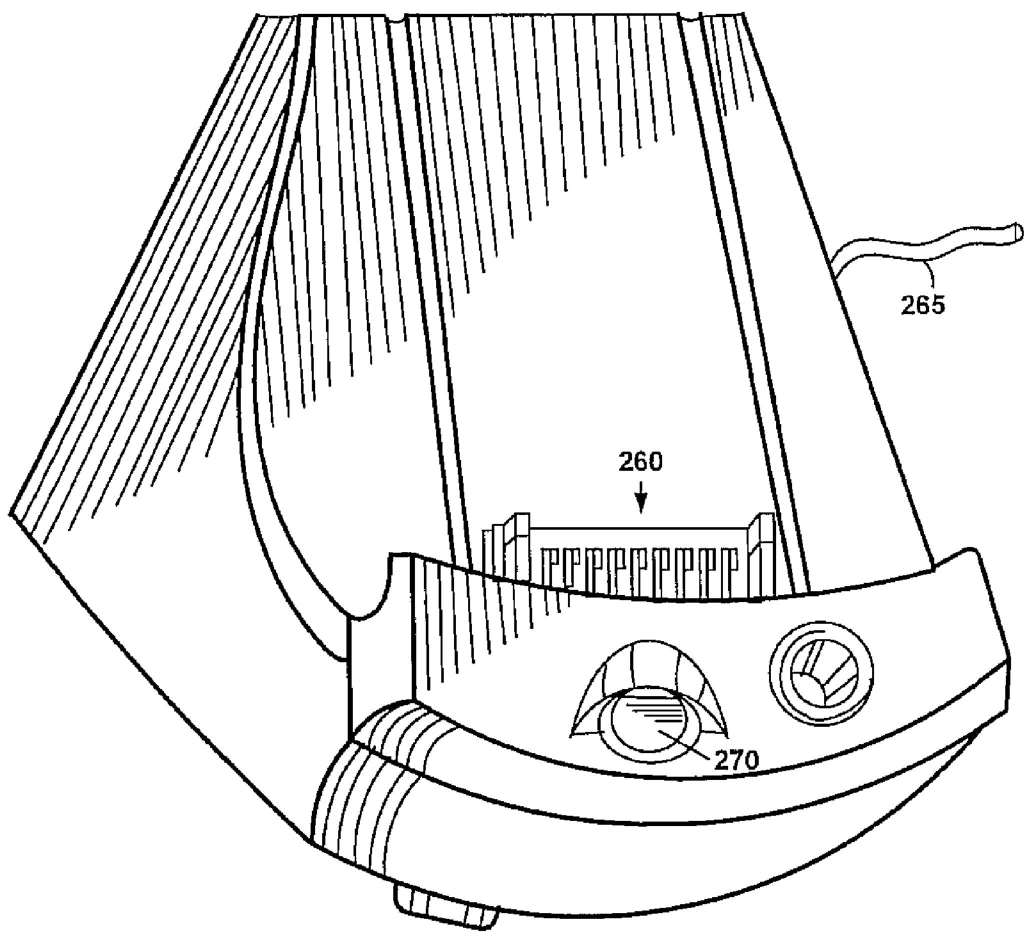
FIG. 5 is a perspective view of the cradle device for connecting the portable computer system to other systems via a communication interface in accordance with one embodiment of the present invention.

FIG. 5 is a perspective illustration of one embodiment of the cradle 60 for receiving the palmtop computer system 100. Cradle 60 contains a mechanical and electrical interface 260 for interfacing with communication interface 108 (FIG. 3) of computer system 100 when system 100 is slid into the cradle 60 in an upright position. Once inserted, button 270 can be pressed to initiate two-way communication (e.g., a communication session) between computer system 100 and other computer systems coupled to serial communication 265.

Exemplary Desktop/Laptop/Server Platform

Figure 6:
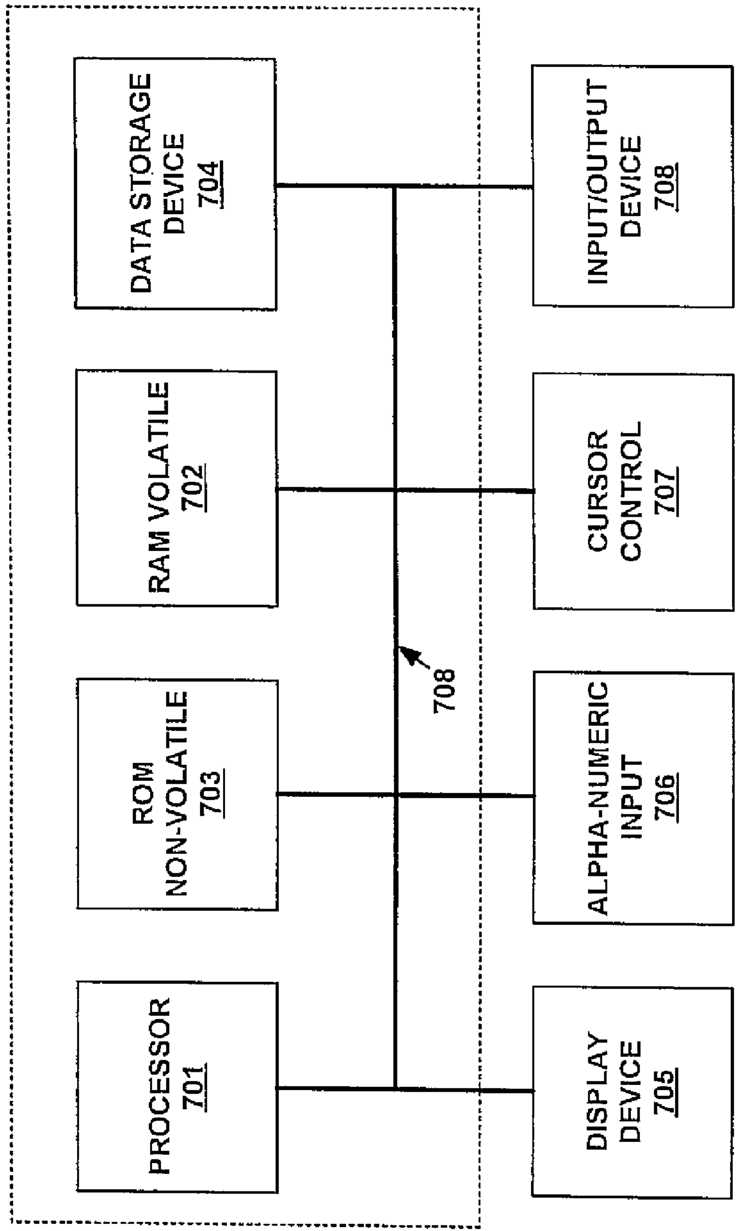
FIG. 6 is a block diagram of one embodiment of a server, desktop or laptop computer system in accordance with the present invention.

Refer now to FIG. 6 which illustrates an exemplary computer system 342 with which embodiments of the present invention may be practiced. Computer system 342 exemplifies desktop computer system 56 or laptop computer system 58 of FIG. 1B. Computer system 342 also exemplifies a server computer system in a computer system network (such as server 30 in FIGS. 1A through 1F) or a proxy server computer (e.g., proxy server 36 of FIG. 1A).

Continuing with reference to FIG. 6, in general, computer system 342 comprises bus 709 for communicating information, processor 701 coupled with bus 709 for processing information and instructions, random access (volatile) memory (RAM) 702 coupled with bus 709 for storing information and instructions for processor 701, read-only (non-volatile) memory (ROM) 703 coupled with bus 709 for storing static information and instructions for processor 701, data storage device 704 such as a magnetic or optical disk and disk drive coupled with bus 709 for storing information and instructions, an optional user output device such as display device 705 coupled to bus 709 for displaying information to the computer user, an optional user input device such as alphanumeric input device 706 including alphanumeric and function keys coupled to bus 709 for communicating information and command selections to processor 701, and an optional user input device such as cursor control device 707 coupled to bus 100 for communicating user input information and command selections to processor 701. Furthermore, an optional input/output (I/O) device 708 is used to couple computer system 342 to, for example, a communication bus (e.g., communication bus 54 of FIG. 1B).

Continuing with reference to FIG. 6, display device 705 utilized with computer system 342 may be a liquid crystal device, cathode ray tube, or other display device suitable for creating graphic images and alphanumeric characters recognizable to the user. Cursor control device 707 allows the computer user to dynamically signal the two-dimensional movement of a visible symbol (pointer) on a display screen of display device 705. Many implementations of the cursor control device are known in the art including a trackball, mouse, joystick or special keys on alphanumeric input device 706 capable of signaling movement of a given direction or manner of displacement. It is to be appreciated that the cursor control 707 also may be directed and/or activated via input from the keyboard using special keys and key sequence commands. Alternatively, the cursor may be directed and/or activated via input from a number of specially adapted cursor directing devices.

Figure 7:
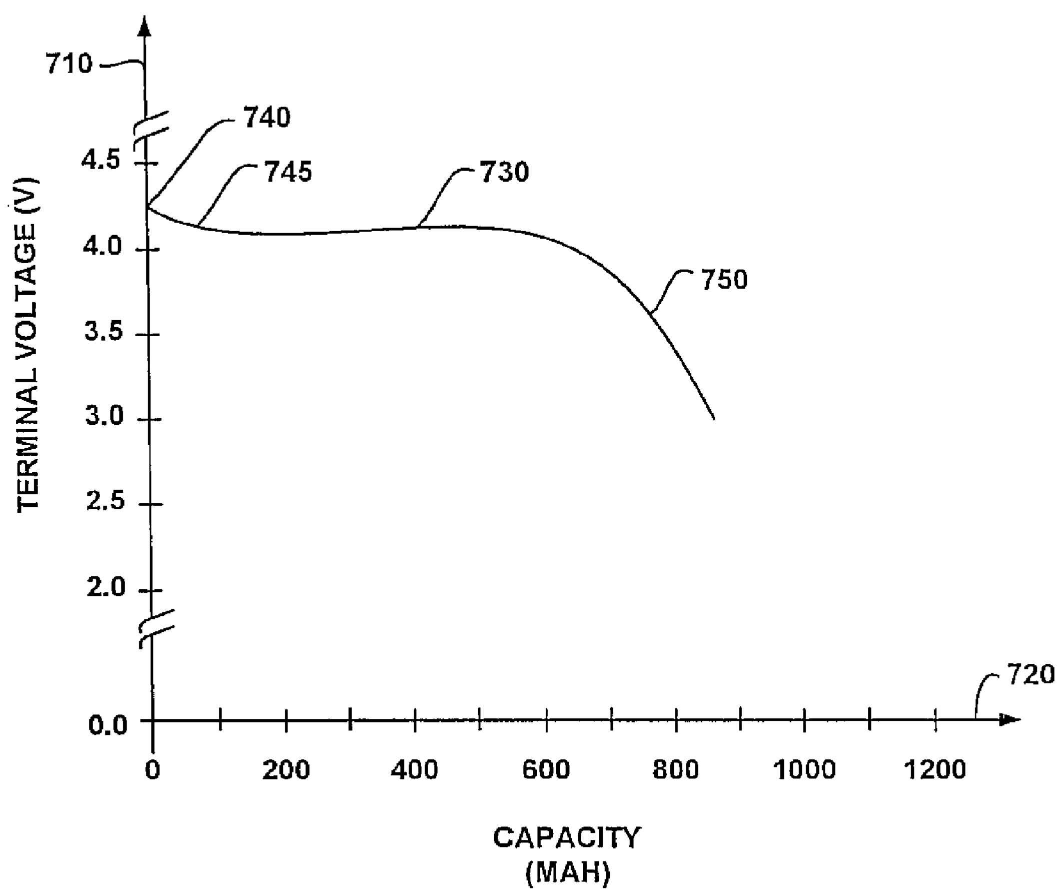
FIG. 7 is a terminal voltage discharge curve typical of a voltage source utilized to supply electrical power in a portable computer or PDA.

FIG. 7 is a performance curve 700 showing terminal voltage versus capacity typical of a power source composed of a number of energy cells used to supply electrical power required for a portable device such as a PDA. The vertical axis is a segmented scale showing a range of terminal voltage 710 between 2.5 volts and 4.5 volts. The horizontal scale illustrates the quantity of source capacity delivered to a load 720 in milliampere-hours (mAh). The power source illustrated here has a rated capacity somewhat less than 1000 mAh. The resulting curve 730 demonstrates how source terminal voltage 710 reduces in magnitude as the capacity of the source 720 to deliver power to a load is depleted. In the fully charged state 740, this particular source has a terminal voltage of about 4.25 volts. Beginning discharge, the terminal voltage then decreases rather quickly 745 to around 4.0 volts. Thereafter, the terminal voltage steadily decreases at a slower rate with discharge, until a region 750 nearing complete discharge, after which the terminal voltage drops rapidly. This figure shows the deterioration of terminal voltage typical of a power source used with a portable device such as a PDA, and thus illustrates the need for power source management.

Figure 8:
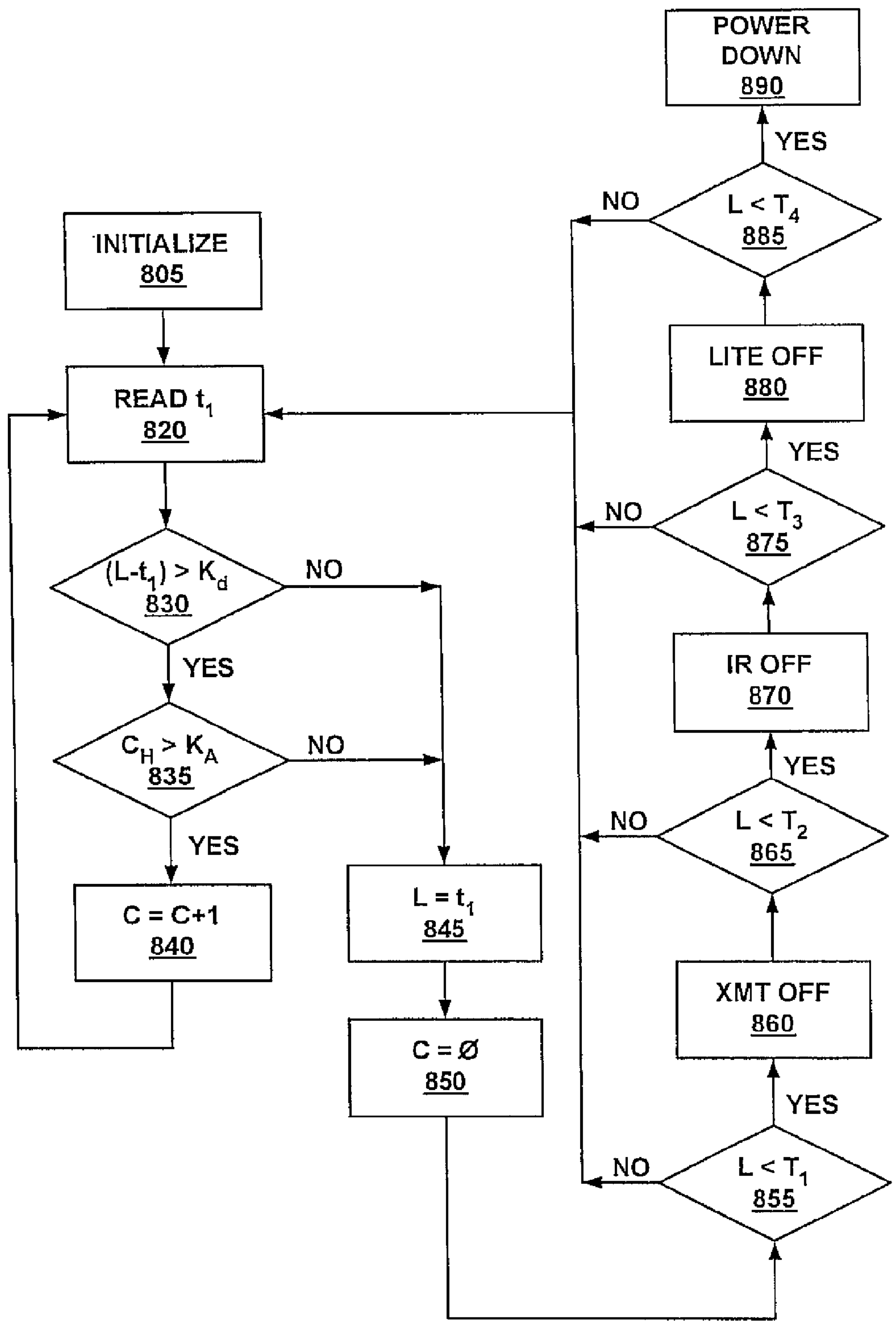
FIG. 8 is a flowchart showing the steps in a process for monitoring the terminal voltage of a source used to supply electrical power to a portable computer or PDA and affecting appropriate action in accordance with the present invention.

FIG. 8 illustrates a flow diagram of steps 800 performed by a power management program according to the present invention. It is appreciated that the process 800 may be implemented as software code stared in computer readable memory unit 103 and executed by processor 101. At step 805, the power management program is invoked. Initial values for constants particular to the device (PDA) in use are recalled from memory and used to initialize the program. Such values may include, but are not limited to:

a) initial source terminal voltage=L
b) counter value=C
c) maximum number of bad readings=$K_m$
d) terminal voltage differential (delta filter)=$K_d$
e) operational terminal voltage limit values=$T_1$, $T_2$, $T_3$, $T_4$ At step 820, the existing source terminal voltage is read and recorded in memory as value $t_1$. The program proceeds to step 830 where the value $(L-t_1)$ is computed and compared with the terminal voltage differential $K_d$. If the quantity $(L-t_1)$ is not greater than $K_d$, then there are two possibilities:

a) $t_1$ is slightly less then L, which indicates normal terminal voltage reduction with discharge;

b), or $t_1$ is greater than L—that is, the quantity $(L-t_1)$ is negative, which indicates the terminal voltage has actually increased above $t_1$. Such would be the case for example if the radio transmitter had been activated for a period of time, and then deactivated. In either case a) or b), the system will advance to step 845, wherein a new value for L is set equal to the just measured value $t_1$. In the case of a), the new value for L will be slightly lower than the prior value, as would be expected for a slowly decreasing terminal voltage. In the case of b), the new value for L will be considerably higher as would be the case when a current load is suddenly removed from the power source. The program will then proceed to step 850 where the count C will be set, or reset to zero.

Returning to step 830, if the quantity $(L-t_1)$ is greater than $K_d$, the change in terminal voltage is greater than the terminal voltage differential $K_d$. In this case the system proceeds to step 835 in an effort to determine if this reduction in terminal voltage is a singular event, or if it is long lasting. If the preset count C is equal to zero, it means this is a singular event and the program advances to step 840, where the count C is increased by one. The program then returns to step 820, reads a new value for $t_1$, and repeats the process described for step 820. Only if the quantity $(L-t_1)$ is again greater than $K_d$, will the program advance again to step 835, showing that this is not a singular occurance. The value of count C is an indication of the number of times this event has occured. The count C is then compared to the maximum count allowed $K_m$. If $C<K_m$, the program increases the value of C by one, and returns to step 820. Only when the count C exceeds $K_m$ will the program advance from step 835 to step 845 where a new value for L is established as the most recent value of $t_1$.

After determining a new value for L in step 845 and setting the count C to zero in step 850, the program advances to step 855 to begin comparison of the latest value of L with operational terminal voltage limit values $T_1$, $T_2$, $T_3$, and $T_4$. It is to be appreciated that in the present embodiment, four operational terminal voltage limit values have been chosen for illustrative purposes, as have the functions associated with them. In other embodiments, there may be more or fewer operational terminal voltage values and the functions associated with them may be different than in the present embodiment. It is noted that all of the operational terminal voltage limit values in the present embodiment have numerical values less than the initial terminal voltage L of the power source, and their magnitudes are ordered as $L>T_1>T_2>T_3>T_4$.

Upon advancing to step 855, the most recent terminal voltage value L is compared with $T_1$. If $L>T_1$, the program returns to step 820 and repeats as described previously. If $L<T_1$, the program advances to step 860, wherein activation of a radio transmitter is prohibited. The program then advances to step 865. In step 865, If $L>T_2$, the program returns to step 820 and repeats as described previously. If $L<T_2$, the program advances to step 870, wherein activation of infra-red (IR) communication is prohibited. The program then advances to step 875 where L is compared with $T_3$. If $L>T_3$, the program returns to step 820 and repeats as described previously. If $L<T_3$, the program advances to step 880 where back lighting of the display screen is prohibited. The program then advances to step 885 to compare L with $T_4$. If $L>T_4$, the program returns to step 820 and repeats as described previously. If $L<T_4$, the program advances to step 890 where the display screen is deactivated and the portable unit is powered down except for functions required to preserve stored data and programs.

Figure 9:
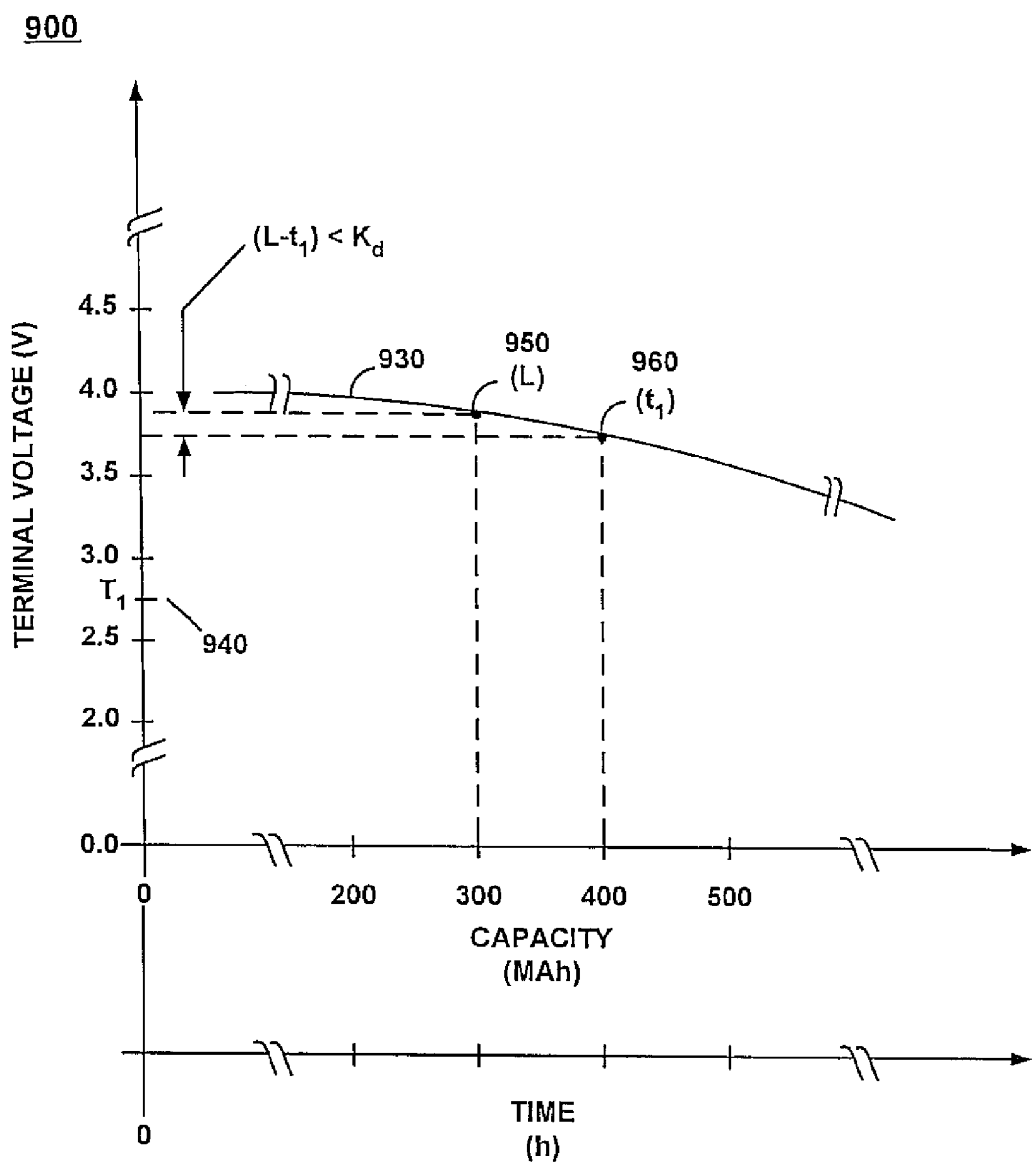
FIG. 9 is an expanded portion of the terminal voltage discharge curve of FIG. 7 showing the expected gradual lowering of terminal voltage with discharge in accordance with the present invention.

FIG. 9 illustrates steps 900 in the power source management program that are followed with gradual diminishment of the source terminal voltage. A portion of the terminal voltage discharge curve 930 taken from the mid region of the curve 730 is reproduced in FIG. 9. The first operational voltage terminal voltage limit $(T_1)$ 940 is located well below the curve 930. In accordance with step 820, the most recent terminal voltage value (L) 950 taken in step 820 is compared with the current terminal voltage measurement $(t_1)$ 960 in step 830, and it is found that $(L-t_1)<K_d$. As a result, L is set equal to the new value $L=T_1$ in step 845, C is set (or reset) to C=0 in step 850. After determining that $L>T_1$ in step 855, the program returns to step 820. This is the expected mode of operation in the mid region of the terminal voltage discharge curve, where the power management system periodically updates the slowly decreasing value of terminal voltage observed in the absence of sudden changes in power source loads.

Figure 10:
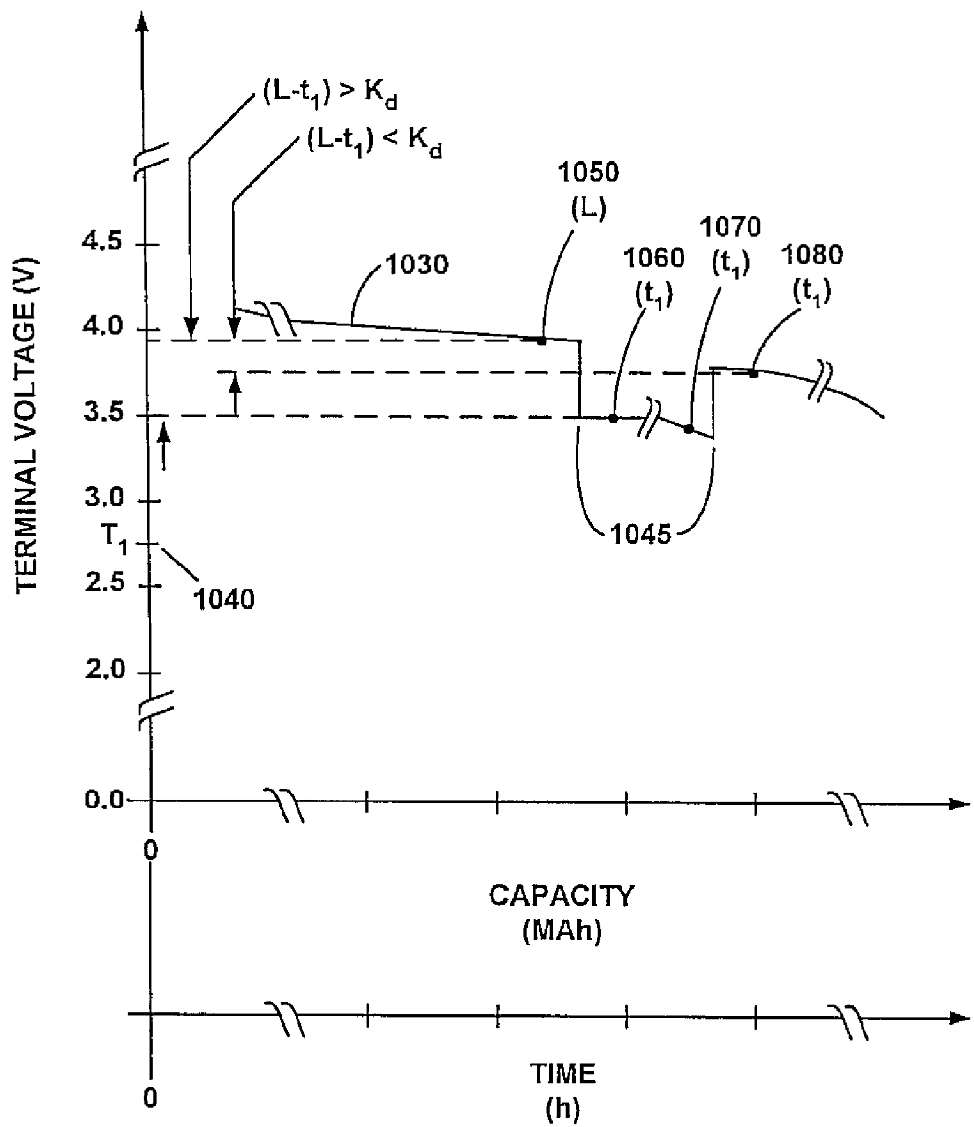
FIG. 10 is an expanded portion of the terminal voltage discharge curve of FIG. 7 showing the expected gradual lowering of terminal voltage with discharge which includes a momentary decrease in terminal voltage due to an increase in terminal current in accordance with the present invention.

FIG. 10 illustrates steps 1000 in the power source management program that are followed during gradual diminishment of the source terminal voltage in which a sudden, but momentary, current load is demanded of the power source. A portion of the terminal voltage discharge curve 1030 taken from the mid region of the curve 730 is reproduced in FIG. 10 with a representative reduction in voltage level 1045 caused by a momentary increase in power source current. The first operational voltage terminal voltage limit $(T_1)$ 1040 is located well below the curve 1030. In accordance with step 820, the most recent terminal voltage value (L) 1050 taken in step 820 is compared with the current terminal voltage measurement $(t_1)$ 1060 in step 830, and it is found that $(L-t_1)>K_d$. This indicates a large decrease in source terminal voltage and the program advances to step 835 where the value of C is found to be zero (C=0). This is thus the first time that this reduction in terminal voltage is noted, so in step 840 the value of C is set to 1 (C=1), the value of L unchanged and the program returns to step 820. A new value of terminal voltage $(t_1)$ is taken 10701 and in step 830 it is again found that $(L-t_1)>K_d$. Checking the value of C in step 835 reveals that $0<C<K_m$. The reduction in terminal voltage has therefore been noted before, but not more than $K_m$ times. Thus the program returns again to step 820 where a new reading for $t_1$ is taken 1080. This value is compared in step 830 and it is found that $(L-t_1)<K_d$. This indicates the terminal voltage has increased to a value that is within $K_d$ of the latest stored value of L which indicates that the prior momentary increase in load has been removed from the power source. The program then advances to step 845, sets L equal to the value of $t_1$ taken at 1080, sets C=0 in step 850, notes that $L>T_1$ in step 855, and returns to step 820. By these means, the power management program of the present invention has determined that a sudden change in source terminal voltage is momentary, and has eliminated this momentary change from the periodic terminal voltage updates.

Figure 11:
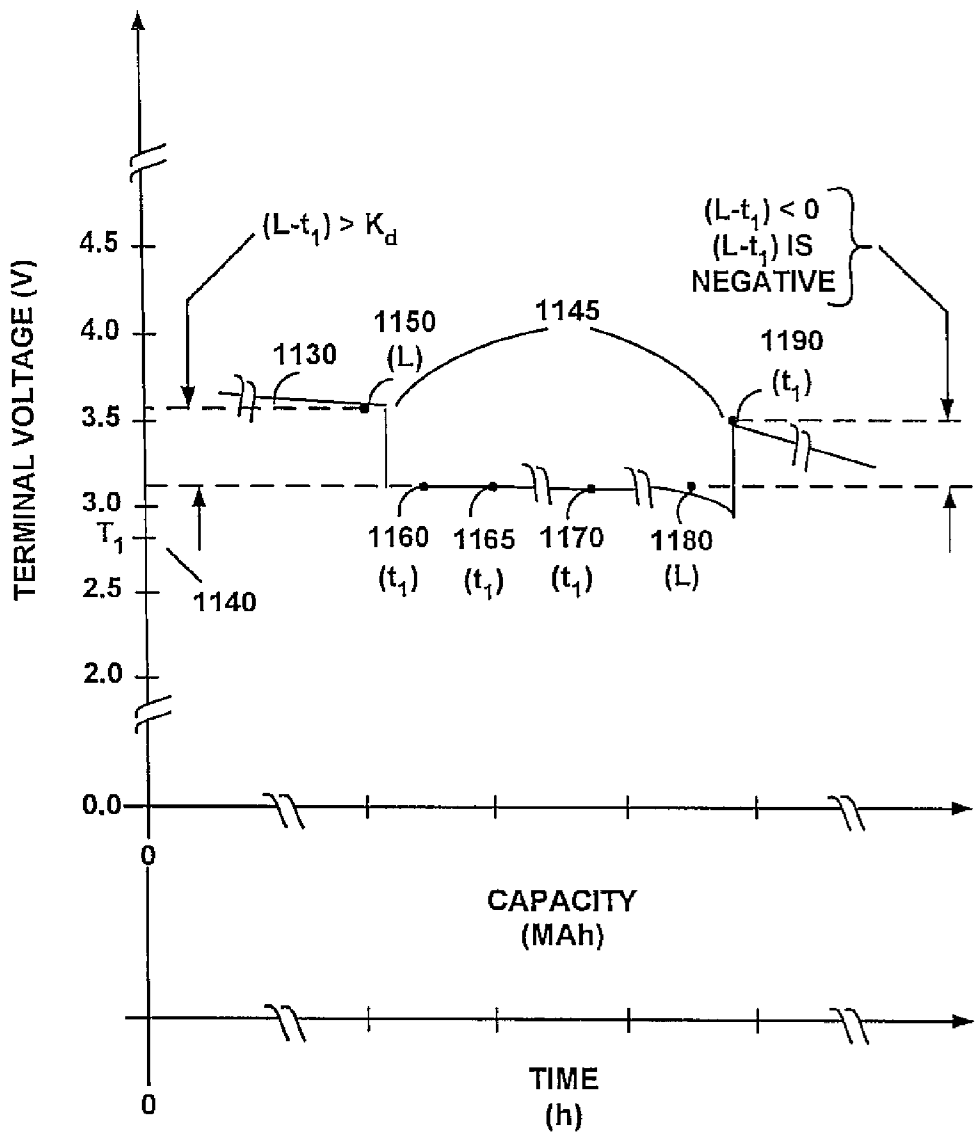
FIG. 11 is an expanded portion of the terminal voltage discharge curve of FIG. 7 showing the expected gradual lowering of terminal voltage with discharge which includes a continuing decrease in terminal voltage due to an increase in terminal current in accordance with the present invention.

FIG. 11 illustrates steps 1100 in the power source management program that are followed during gradual diminishment of the source terminal voltage in which a sudden, extended, current load is demanded of the power source. A portion of the terminal voltage discharge curve 1130 taken from the mid region of the curve 730 is reproduced in FIG. 11 with a representative reduction in voltage level 1145 caused by an extended increase in power source current. The first operational voltage terminal voltage limit $(T_1)$ 1140 is located well below the curve 1130. In accordance with step 836, the most recent updated terminal voltage value (L) 1150 is compared with the current terminal voltage measurement $(t_1)$ 1160 taken in step 820, and it is found that $(L-t_1)>K_d$. This indicates a large decrease in source terminal voltage and the program advances to step 835 where the value of C is found to be zero (C=0). This is thus the first time that this reduction in terminal voltage is noted, so the value of C is set to 1 in step 840, the program leaves the value of L unchanged 1150 and returns to step 820. A new value of terminal voltage $(t_1)$ is taken 1165, and in step 830 it is again found that $(L-t_1)>K_d$. Checking the value of C in step 835 reveals that $0<C<K_m$. The reduction in terminal voltage has therefore been noted before, but not more than $K_m$ times. Thus the program returns again to step 820 where a new reading for to is taken 1170. This value is compared in step 830 and it is again found that $(L-t_1)>K_d$. This is an indication that the terminal voltage remains at a value that is still well below the stored value of L. Checking the value of C in step 835 reveals that $C>K_m$. The reduction in terminal voltage has therefore been noted at least $K_m$ times. The program then advances to step 845, sets L equal to the value of $t_1$ taken at 1170, sets C=0 in step 850, notes that L>$T_1$ in step 855, and returns to step 820. By these means, the power management program of the present invention has determined a sudden and lasting change in source terminal voltage and has updated the current value of terminal voltage L accordingly.

Referring again to FIG. 11, the power source management program then continues with updates to normal terminal voltage reduction as described with the steps taken 900 in FIG. 9 until the most recent value of L 1180. In step 820, a new reading for $t_1$ is taken 1190. This value is compared in step 830 and it is found that $(L-t_1)<K_d$. In fact, $(L-t_1)$ is negative, which is an indication that the terminal voltage has increased in value which corresponds to the removal of a current load from the power source. The program then advances to step 845, sets L equal to the value of $t_1$ taken at 1190, sets C=0 in step 850, notes that—L>$T_1$ in step 855, and returns to step 820. By these means the power source management program of the present invention has the demonstrated ability to account for a sudden increase in terminal voltage which may occur with the removal of or reduction in power source load current and update stored terminal voltage values accordingly.

Figure 12:
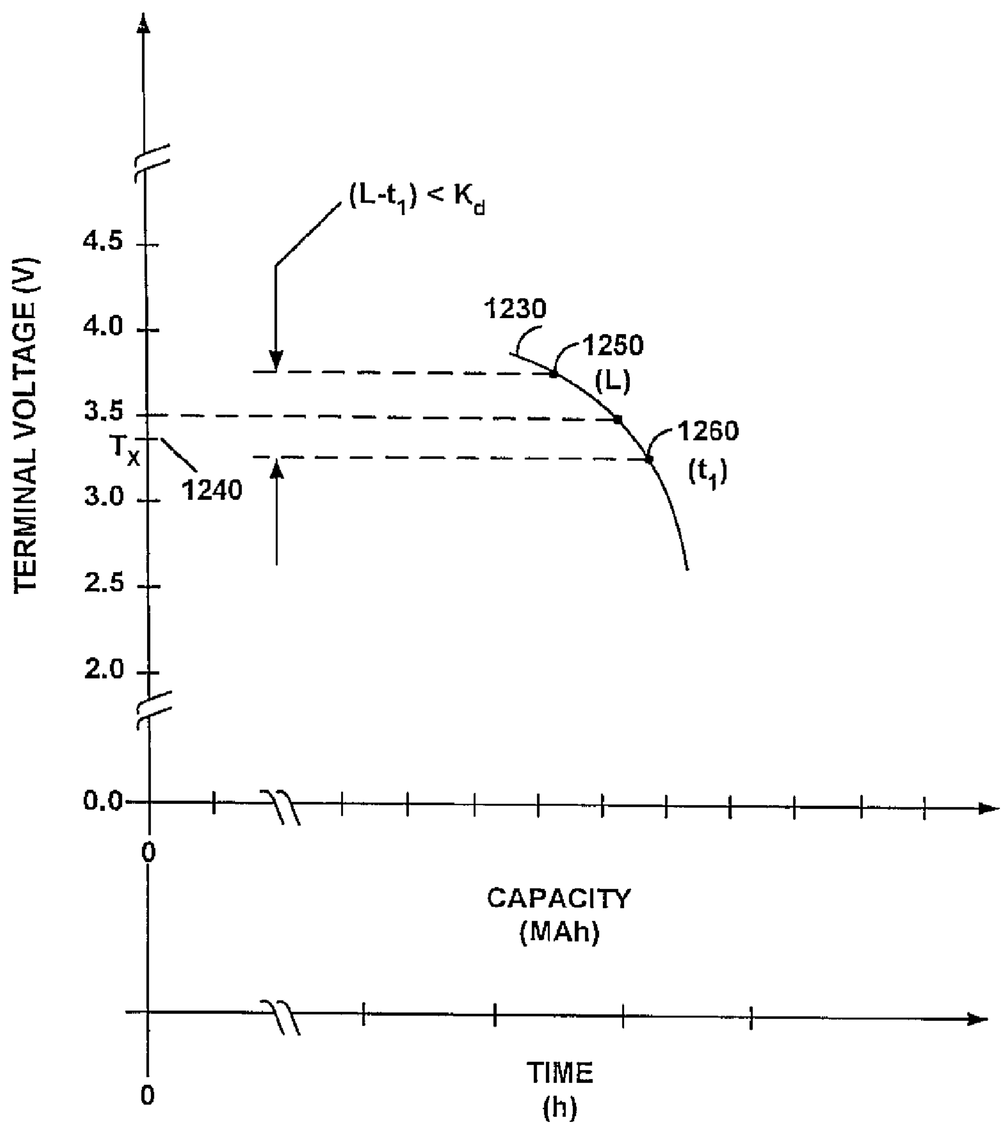
FIG. 12 illustrates steps taken by the power source management program as the power source nears complete discharge.

FIG. 12 illustrates the steps taken 1200 by the power source management program as the power source nears compete discharge. A portion of the curve 750 taken from FIG. 7 is expanded 1230 in FIG. 12. The source terminal voltage is discharging as expected and the program is periodically updating terminal voltage values as previously described in accordance with FIG. 9. In step 830, the most recent terminal voltage value (L) 1250 is compared with the current terminal voltage measurement ($t_1$) 1260 taken in step 820, and it is found that $(L-t_1)<K_d$. The program advances to step 845, updates L to the most recent value of $t_1$, sets C=0 in step 850 and advances to step 855. In this case, it is found that L is now less than one of the operational voltage limits $T_x$, 1240. As a result, one or more of the device functions are terminated, after which the program returns to step 820 provided $T_x$ (1240) is not $T_4$. The process is repeated, and when L is found to decrease below the operational limit $T_4$, the program advances to step 890 to power down the portable device.

The preferred embodiment of the present invention, battery voltage sag avoidance algorithm for a wireless handheld device, is thus described. While appreciated that the present invention should not be construed as limited by such embodiments, but rather construed according to the below claims.

What is claimed is:

1. A method comprising:

measuring and storing an updated power characteristic associated with a portable device, the measuring occurring at least twice;

comparing the updated power characteristic with at least one of a plurality of power characteristic limits; and altering a first system operating function when the updated power characteristic is outside of one of the plurality of power characteristic limits for a first predetermined period of time based on a number of times the updated power characteristic is measured and maintaining a second system operating function in an operating mode.

2. The method as recited in claim 1, the power characteristic of the portable device comprising a cell that stores electrical energy.

3. The method as recited in claim 1, wherein the portable device is a handheld computer system.

4. The method as recited in claim 1, the measuring and the storing comprising:

determining and storing an updated terminal voltage using one measured source terminal voltage and one prior stored source terminal voltage.

5. The method as recited in claim 1, the altering comprising:

terminating the first system operating function when the updated power characteristic is outside a first power characteristic limit for the first predetermined period of time, the first operating function comprising transmitting a radio signal.

6. The method as recited in claim 5, the altering comprising:

terminating a third system operating function when the updated power characteristic is outside a third power characteristic limit for a third predetermined period of time, the third operating function comprising an infrared (IR) signal communication link.

7. The method as recited in claim 6, the altering comprising:

terminating a fourth system operating function when the updated power characteristic is outside a fourth power characteristic limit for a fourth predetermined period of time, the fourth operating function comprising backlighting of a display screen.

8. The method as recited in claim 7, the altering comprising:

terminating a fifth system operating function when the updated power characteristic is outside a fifth power characteristic limit for a fifth predetermined period of time, the fifth operating function comprising display of information on a display.

9. A method comprising:

determining an updated power characteristic associated with a portable device, the determining occurring at least twice;

detecting a non-momentary fluctuation when the updated power characteristic is outside of one of a plurality of power characteristic limits for a first predetermined period of time based on a number of times the updated power characteristic is measured; and altering a first system operating function and maintaining a second system operating function in an operating mode.

10. The method as recited in claim 9, the altering comprising:

terminating the first system operating function when the updated power characteristic is outside a first power characteristic limit for the first predetermined period of time, the first operating function comprising transmitting a radio signal.

11. The method as recited in claim 9, the altering comprising:

terminating a third system operating function when the updated power characteristic is outside a third power characteristic limit for a third predetermined period of time, the third operating function comprising an infrared (IR) signal communication link.

12. The method as recited in claim 9, the altering comprising:

terminating a fourth system operating function when the updated power characteristic is outside a fourth power characteristic limit for a fourth predetermined period of time, the fourth operating function comprising illumination of information on a display screen.

13. The method as recited in claim 9, the altering comprising:

terminating a fifth system operating function when the updated power characteristic is outside a fifth power characteristic limit for a fifth predetermined period of time, the fifth operating function comprising display of information on a display.

14. The method as recited in claim 9, the power characteristic of the portable device comprising a cell that stores electrical energy.

15. The method as recited in claim 9, wherein the portable device is a handheld computer system.

16. The method as recited in claim 9, the determining comprising:

utilizing a measured source terminal voltage and a prior stored source terminal voltage to determine and store an updated terminal voltage for the updated power characteristic of the portable device.

17. The method as recited in claim 9, the detecting comprising:

comparing at least two consecutive updated power characteristics.

18. A system for managing power characteristics of a portable device, the system comprising:

a device having a storage medium comprising a plurality of stored power characteristic limits, measured power characteristics data, and operational power control functions, the device communicatively coupled with the portable device, the device to measure the power characteristics data and to determine updated power characteristics data, the device to compare the updated power characteristics data with the plurality of stored power characteristic limits, and the device to activate one of the operational power control functions when the updated power characteristics data is outside of one of the plurality of stored power characteristic limits for a predetermined period of time based on a number of times the power characteristics data is measured, the activation causing termination of a first operating function and maintaining a second operating function in an operating mode.

19. The system of claim 18, wherein the portable device is a handheld computer system.

20. The system of claim 18, the power characteristics data comprising a cell that stores electrical energy.

21. The system of claim 18, the operational control functions comprising a command to terminate a system operation.

* * * * *

UNITED STATES PATENT AND TRADEMARK OFFICE

CERTIFICATE OF CORRECTION

PATENT NO. : 8,392,738 B2
APPLICATION NO. : 12/606961
DATED : March 5, 2013
INVENTOR(S) : John S. LeFevre et al.

It is certified that error appears in the above-identified patent and that said Letters Patent is hereby corrected as shown below:

On the Title page, in Item (54) and in the specification, column 1, line 1, Title, delete “SAF” and insert -- SAG --, therefor.

Signed and Sealed this
Twentieth Day of August, 2013

Teresa Stanek Rea
*Acting Director of the United States Patent and Trademark Office*